United States Patent [19]

Hosokawa

[11] Patent Number: 4,635,694
[45] Date of Patent: Jan. 13, 1987

[54] PNEUMATIC RADIAL TIRE TREAD FOR HEAVY LOAD

[75] Inventor: Ichiro Hosokawa, Kanagawa, Japan
[73] Assignee: The Yokohama Rubber Co., Ltd., Tokyo, Japan
[21] Appl. No.: 590,441
[22] Filed: Mar. 16, 1984

[30] Foreign Application Priority Data

Mar. 25, 1983 [JP] Japan .................. 58-48659

[51] Int. Cl.$^4$ .............................................. B60C 11/04
[52] U.S. Cl. .................................................. 152/209 A
[58] Field of Search ........... 152/209 A, 209 R, 209 D

[56] References Cited

U.S. PATENT DOCUMENTS

| | | | |
|---|---|---|---|
| 3,162,229 | 12/1964 | Ellenrieder et al. | 152/209 A |
| 3,217,776 | 11/1965 | Ellenrieder et al. | 152/209 A |
| 3,286,756 | 11/1966 | Ellenrieder et al. | 152/209 A |

FOREIGN PATENT DOCUMENTS 0004409 1/1982 Japan .................. 152/209 A

Primary Examiner—Michael Ball
Attorney, Agent, or Firm—Finnegan, Henderson, Farabow, Garrett & Dunner

[57] ABSTRACT

A pneumatic radial tire for heavy load is provided in which a tread design formed on the tread portion is divided into a tread part Ab with larger ground contact area ratio and a tread part Aa with smaller ground contact area ratio with the tread equator plane as a boundary, the ratio Sa/Sb of a ground contact area ratio Sa of the tread part Aa to a ground contact area ratio Sb of the tread part Ab is set in a range of 0.71 through 0.89, and the tread part Aa with smaller ground contact area ratio is located on the inner side of a vehicle when the tire is mounted thereon. Whereby, abnormal wears, such as one-sided wear or shoulder wear, occurred in the tread portion of the tire mounted to, particularly, a steering wheel can be alleviated so as to improve wear resistance of the tread portion and hence to prolong the service life of the tire remarkably.

2 Claims, 11 Drawing Figures

FIG. 3
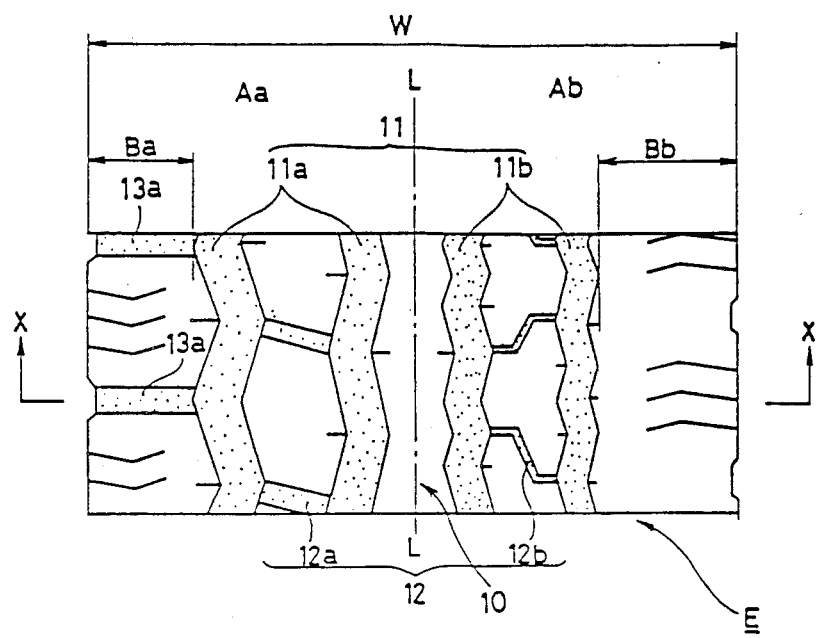
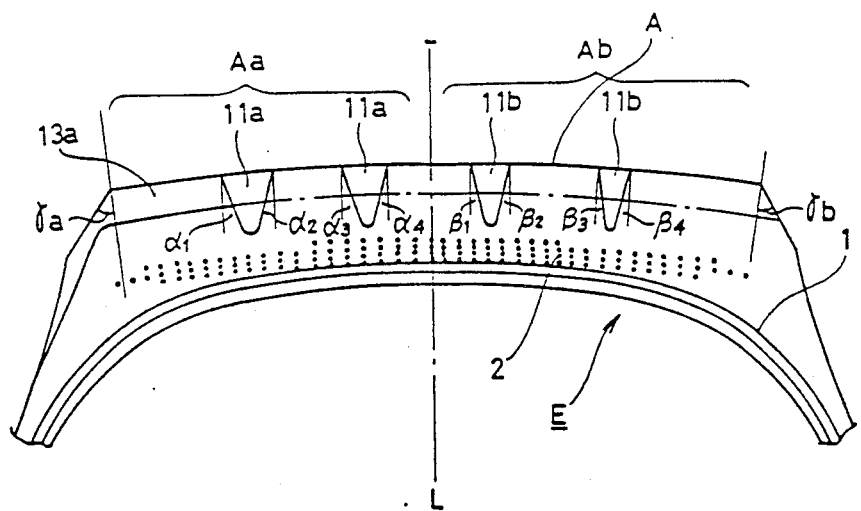
FIG. 4

PNEUMATIC RADIAL TIRE TREAD FOR HEAVY LOAD

FIELD OF THE INVENTION

This invention relates to a pneumatic radial tire for heavy load, and more particularly, to a pneumatic radial tire for heavy load which has a tread design so improved as to alleviate abnormal wears occurred in a tread portion and enhance wear resistance of the tread portion.

BACKGROUND OF THE INVENTION

In the past, various attempts have gone into improving a tread design for a tread portion to prevent abnormal wears, such as uneven or sloped wear or shoulder wear, in the tread portion of a pneumatic radial tire for heavy load used in trucks, buses, light trucks, etc.

It is, however, the present state of the art that any of the conventional attempts falls under the category of such a tread design which affords the tread portion in a bisymmetrical form with the tread equator plane as the center, as shown in FIG. 1.

On the other hand, when a tire is used while being actually put on a vehicle, it shows different wear rates on the right and left side with the tread equator plane as the center, namely, on the inner and outer side of the vehicle. Particularly, a tire mounted on the front wheel side (i.e., on the steering wheel side) gives a faster wear rate of the tread portion on the outer side of the vehicle than that on the inner side thereof due to influences caused by turning at a corner or the like.

Therefore, the conventional tire having a bisymmetrical tread design with the tread equator plane as the center results in a larger wear rate on the outer side of the tread portion than that on the inner side thereof, particularly when mounted on the steering wheel side, due to influences caused by turning at a corner or the like. FIG. 2 illustrates the abnormal wear thus resulted, and this is one of primary factors of less wear resistance of tires. For example, the service life of such a tire will expire at the time when the grooves on the outer side are completely gone because of the abnormal wear.

SUMMARY OF THE INVENTION

The present invention has been accomplished as a result of repeating experiments and concentrated studies with a view to solve the problems as mentioned above.

It is therefore an object of the present invention to provide a pneumatic radial tire for heavy load which can alleviate abnormal wears occuring in a tread portion and improve wear resistance of the tread portion.

More specifically, the pneumatic radial tire for heavy load according to the present invention is featured in that a tread design formed on a tread portion is divided into a tread part Ab with larger ground contact area ratio and a tread part Aa with smaller ground contact area ratio with the tread equator plane as a boundary, the ratio Sa/Sb of a ground contact area ratio Sa of the tread part Aa with smaller ground contact area ratio to a ground contact area ratio Sb of the tread part Ab with larger ground contact area ratio is set in a range of 0.71 through 0.89, and the tread part Aa with smaller ground contact area ratio is located on the inner side of a vehicle when the tire is mounted thereon.

In the following the present invention will be described in detail on preferred embodiments with reference to the accompanying drawings.

BRIEF DESCRIPTION OF THE DRAWINGS

FIGS. 1 and 2 illustrate typical one example of conventional pneumatic radial tires for heavy load; in which FIG. 1 is an explanatory top plan view showing an essential part of the tire and FIG. 2 is an explanatory sectional view of the tire taken along the meridial line;

FIGS. 3 through 5 illustrate pneumatic radial tires for heavy load according to preferred embodiments of the present invention; in which FIG. 3 is an explanatory top plan view showing an essential part of the present radial tire according to the first embodiment, FIG. 4 an enlarged sectional view of an essential part taken along the line X—X in FIG. 3, and FIG. 5 is an explanatory top plan view showing an essential part of the present radial tire according to the second embodiment.

DETAILED DESCRIPTION OF THE INVENTION

Figure 1:
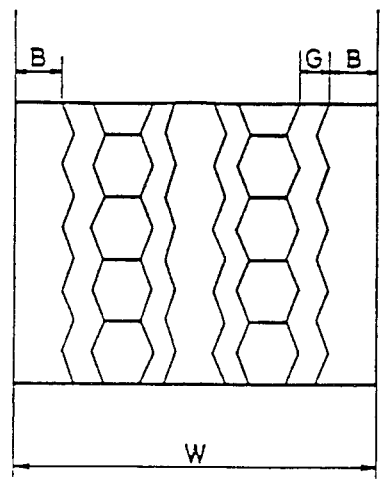

In the drawings, the reference symbol E designates pneumatic radial tires for heavy load according to preferred embodiments of the present invention. Between a pair of right and left bead portions (not shown) of each radial tire there is arranged a carcass layer 1 which has a cord angle of substantially 90° with respect to the circumferential direction of the tire, and over the steel carcass layer 1 in a tread portion A there are disposed a plurality of belt layers 2 which have a cord angle of 60° with respect to the circumferential direction of the tire.

In the present invention, more specifically, a tread design 10 formed on the tread portion A is divided into a tread part Ab which has a larger ground contact area ratio and locates on the outer side of a vehicle when mounted thereon, and a tread part Aa which has a smaller ground contact area ratio and locates on the inner side of the vehicle when mounted thereon, with the tread equator plane L—L as a boundary. And the ratio Sa/Sb of a ground contact area ratio Sa of the tread pat Aa with smaller ground contact area ratio to a ground contact area ratio Sb of the tread part Ab with larger ground contact area ratio is set in a range of 0.71 through 0.89.

The structure of the tread portion will be now described in detail. According to the first embodiment as shown in FIGS. 3 and 4, the tread design 10 formed in the tread portion A comprises four zigzag main grooves 11 arranged substantially parallel to the equator plane L—L, and a plurality of sub-grooves 12 arranged to extend substantially in the radial direction.

Moreover, the widths of main grooves 11a and sub-grooves 12a arranged in the tread part Aa locating on the inner side of the vehicle when mounted thereon are selected to be larger than those of main grooves 11b and sub-grooves 12b arranged in the tread part Ab locating on the outer side of the vehicle when mounted thereon, in order that the ground contact area ratio Sa of the tread part Aa becomes smaller than the ground contact area ratio Sb of the tread part Ab. Further, on the shoulder side of the tread part Aa there are formed a plurality of lug grooves 13a leading to the main groove 11a with certain intervals in the circumferential direction of the tire.

In this embodiment, the depth of each lug groove 13a on the tread portion side is set substantially ½ of that of the respective main grooves 11a, 11b.

Also in this embodiment, a lateral inclination angle α of the main grooves 11a in the tread part Aa and a lateral inclination angle β of the main grooves 11b in the tread part Ab are selected to meet the following relationship:

$$\alpha > \beta$$

The above-mentioned ground contact area ratios Sa and Sb are respectively represented by the equations below on such assumptions that the ground contact area of a tread ground contact section on the side of the tread part Aa is Ra, the ground contact area of a tread contact section on the side of the tread part Ab is Rb, the groove area of a tread contact section on the side of the tread part Aa is Ga, and the groove area of a tread contact section on the side of the tread part Ab is Gb:

$$Sa = Ra/(Ra+Ga)$$

$$Sb = Rb/(Rb+Gb)$$

Further in this embodiment, the carcass layer 1 is arranged as a single layer and composed of a steel carcass including steel cords as reinforcing cords with a cord angle of 90° with respect to the circumferential direction of the tire. The belt layers 2 are arranged in number of four and include steel cords as reinforcing cords with a cord angle of 57° for the lower most layer and a cord angle of 18° for the remaining three layers with respect to the circumferential direction of the tire.

Hereinafter, the present invention will be explained in more detail with reference to the results of experiments.

Figure 6:
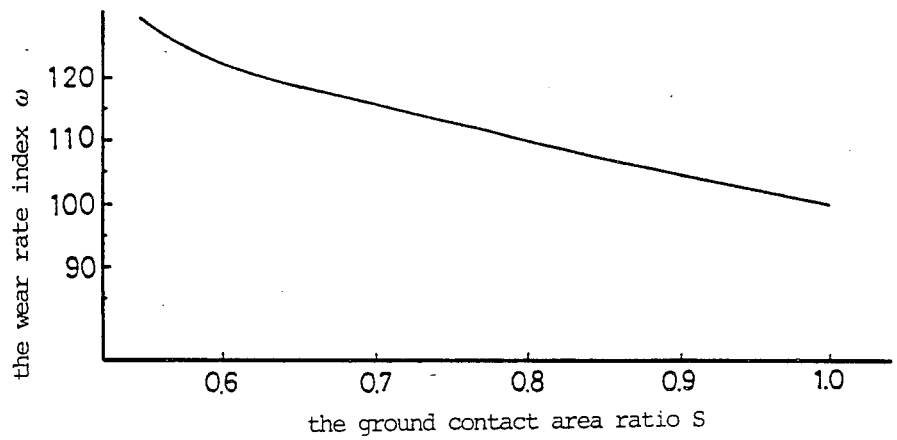
FIGS. 6 through 11 are graphs showing the results of experiments.

A wear rate of the tread portion of a pneumatic radial tire for heavy load is increased as the ground contact area ratio S decreases. As a result of study on the relationship between the ground contact area ratio S and the wear rate, there is obtained the relationship as shown in FIG. 6 by assuming a wear rate index ω to be 100 when the ground contact area ratio S has 1.0 (i.e., in case of a smooth tire).

Figure 7:
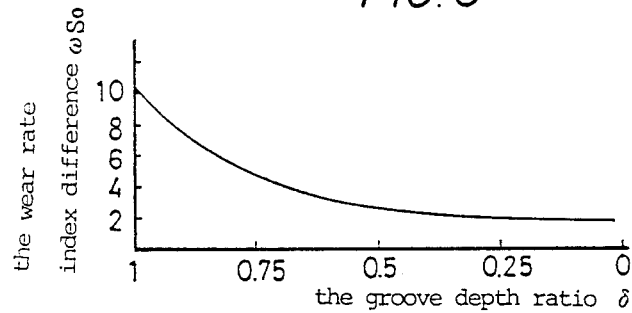

Moreover, the difference in wear rates on the inner and outer sides of the tread portion of the conventional pneumatic radial tire for heavy load mounted on a steering wheel of the heavy vehicle, i.e., the tire having the ground contact area ratios Sa and Sb of the same value on the left and right (inner and outer) side with the tread equator plane as the center, is decreased with reduction in the groove depth. As a result of study on the relationship between the wear rate index difference ωSo and the groove depth ratio δ, there is obtained the relationship as shown in FIG. 7 by assuming a wear rate index difference ωSo to be 10 at the time when the new tire is mounted.

The tire used in the above experiment has the ground contact area ratio Sa and Sb of the same value 0.68. Thus, the ratio Sa/Sb equals to 1.

It is to be noted that the groove depth ratio δ represents the quotient of a remained groove depth divided by a groove depth of the new tire.

Figure 8:
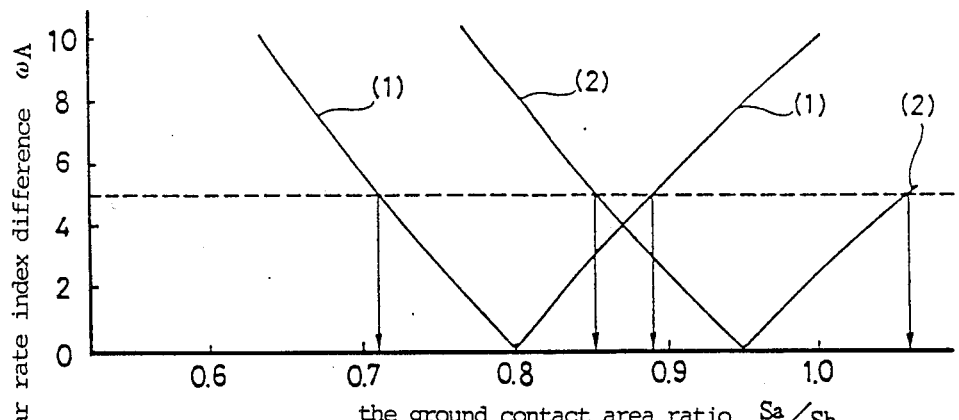

Next, assuming that the tread design formed in the tread portion is divided into a tread part Ab which has a larger ground contact area ratio and locates on the outer side of the vehicle when mounted thereon, and a tread part Aa which has a smaller ground contact ratio and locates on the inner side of the vehicle when mounted thereon, that the ratio of a ground contact area ratio Sa of the tread part Aa with smaller ground contact area ratio to a ground contact area ratio Sb of the tread part Ab with the larger ground contact area ratio is give by Sa/Sb, and that the wear rate index difference is ωA, there is obtained the relationship as shown in FIG. 8 as a result of study on the relationship between the ratio Sa/Sb of the ground contact area ratio Sa to the ground contact area ratio Sb and the wear rate index difference ωA at the times when the tire is new and when the depth of respective grooves constituting the tread design is substantially ½ of the initial depth.

In the figure, the solid line (1) represents the case of the new tire and the solid line (2) represents the case of the tire that the depth of respective grooves constituting the tread design is substantially ½ of the initial depth.

It will be apparent from FIG. 8 that the wear rate difference shows a very large value particularly at the time of initial wear and, therefore, reduction in the wear rate difference at the initial wear time gives a great influence on alleviation of abnormal wears.

It will be also apparent from FIG. 8 that, when a value of the wear rate index difference ωA exceeds 5.0, abnormal wears tend to increase insignificantly and this shortens the service life of tires.

In the present invention, however, the ratio Sa/Sb of the ground contact area ratio Sa and the ground contact area ratio Sb is set in a range of 0.71 through 0.89 as previously noted.

More preferably, the ratio Sa/Sb should be set in a range of 0.76 through 0.84 so as to maintain a value of the wear rate index difference ωA below 2.0.

On the other hand, a value of the ratio Sa/Sb of the ground contact area ratio Sa to the ground contact area ratio Sb at the time when the depth of respecitve grooves constituting the tread design is substantially ½ of the initial depth, is preferably set in a range of 0.85 through 0.98 from the reason as mentioned above. More preferably, the value should be set in a range of 0.92 through 0.98 from the reason as mentioned above.

Next, it is noticeable that the shoulder wear, particular one among abnormal wears, is related to the ratio B/W of a shoulder rib width or shoulder block width B to a tread width W by referring to FIG. 1. In the past, a value of the ratio B/W was considered to be preferably set in a range of 0.18 through 0.22.

However, the pneumatic radial tire for heavy load mounted to, particularly, a steering wheel of the heavy vehicle shows differnt wear rates on the inner and outer side of the tread portion as previously stated, it is required to reduce the difference in wear rates by making shoulder rib widths or shoulder block widths on the inner and outer side of the tread portion different from each other.

Figure 9:
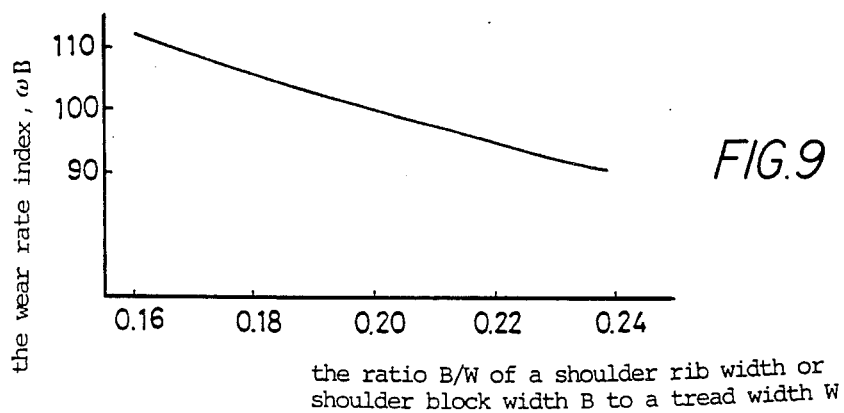

FIG. 9 shows the relationship between the ratio B/W of a shoulder rib width or shoulder block width B to a tread width W and the wear rate index ωB by assuming a value of the wear rate index ωB to be 100 at the time when the ratio B/W has 0.20.

More specifically, on the assumption that the shoulder rib width or shoulder block width of the tread part Aa with smaller ground contact area ratio is Ba and the shoulder rib width or shoulder block width of the tread part Ab with larger ground contact area ratio is Bb. and also that the wear rate indexes of the shoulder ribs or shoulder blocks are ωBa and ωBb, respectively, the wear rate index difference is given by $(\omega Bb - \omega Ba)$ based on the ratio Ba/Bb of the shoulder rib width or shoulder block width Ba to the shoulder rib width or shoulder block width Bb which are not equal to each other.

Figure 10:
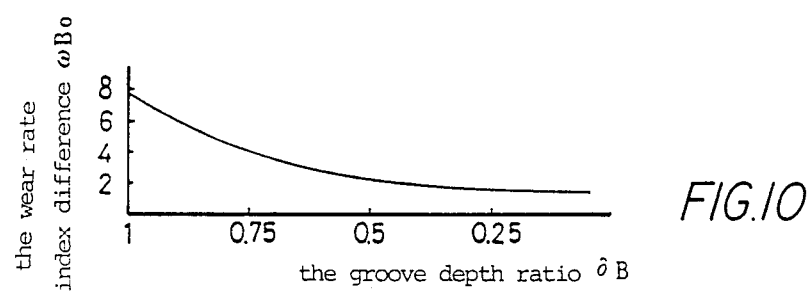

As to the tire mounted on a steering wheel of the heavy vehicle and having the ratio Ba/Bb of the shoulder rib width or shoulder block width Ba to the shoulder rib width or shoulder block width Bb which value equals to 1, the difference in wear rates on the inner and outer side of the tread portion is decreased with reduction in the groove depth. By assuming the wear rate index difference $\omega Bo$ to be 8 at the time when the new tire is mounted, there is obtained the relationship as shown in FIG. 10 as a result of study on the relationship between the wear rate index difference $\omega Bo$ and the groove depth ratio $\delta B$.

The tire used in the above experiment has the ratio Sa/Sb of a value 1.

Incidentially, the groove depth ratio $\delta B$ is the quotient of a remained groove depth divided by a depth of the new tire.

As to the tire according to this embodiment having the ratio Ba/Bb of the shoulder rib width or shoulder block width Ba to the shoulder rib width or shoulder block width Bb which value does not equal to 1, the wear rate index difference $\omega B$ is represented as follows:

$$\omega B = \{\omega Bo - (\omega Bb - \omega Bb)\}$$

Figure 11:
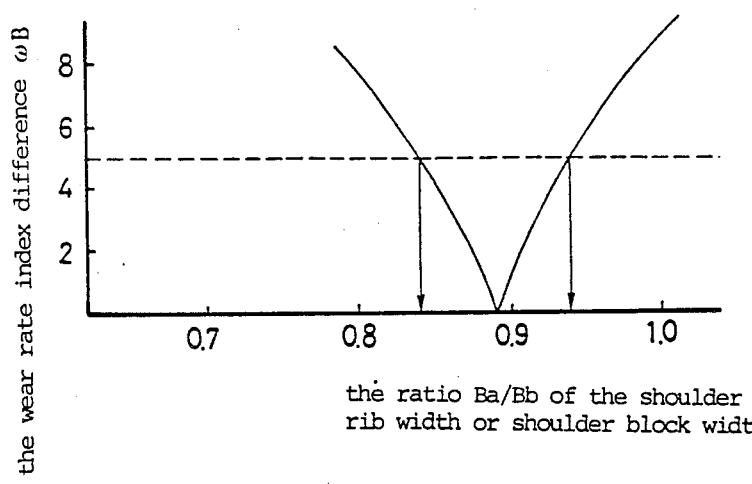

The relationship of the wear rate index difference $\omega B$ and the ratio Ba/Bb of the shoulder rib width or shoulder block width Ba to the shoulder rib width or shoulder block width Bb is given as shown in FIG. 11.

It will be apparent from FIG. 11 that, when a value of the wear rate index difference $\omega B$ exceeds 5.0, abnormal wears tend to inrease significantly and this shortens the service life of tires.

It is therefore preferable to set a value of the ratio Ba/Bb of the shoulder rib width or shoulder block width Ba to the shoulder rib width or shoulder block width Bb in a range of 0.84 through 0.94.

In FIG. 4, designated at $\gamma a$ is an angle of the shoulder on the side of the tread part Aa locating on the inner side when mounted thereon, and at $\gamma b$ is an angle of the shoulder on the side of the tread part Ab locating on the outer side when mounted thereon. Both the shoulders are formed to meet the relationship of $\gamma a > \gamma b$. As previously noted, this is resulted from the purpose of making the ground contact area ratio Sa of the tread part Aa smaller than the ground contact area ratio Sb of the tread part Ab locating on the outer side of the vehicle when mounted thereon.

Subsequently, the effects of the present invention will be explained by referring to an experiment example.

A pneumatic radial tire for heavy load used in this experiment example has such a structure as shown in FIGS. 3 and 4 (i.e., a tire according to the first embodiment of the present invention) and specifications as follows:

the ground contact area ratio Sa of the tread part Aa with smaller ground contact area ratio for a new tire ... 0.63
  the ground contact area ratio Sb of the tread part Ab with larger ground contact area ratio for a new tire ... 0.78
  the ratio Sa/Sb of the ground contact area ratios ... 0.81
  groove angles of the main grooves 11a in the tread part Aa with smaller ground contact area ratio for a new tire
    $\alpha 1$ ... 20°
    $\alpha 2$ ... 18°
    $\alpha 3$ ... 18°
    $\alpha 4$ ... 18°
  groove angles of the main grooves 11b in the tread part Ab with larger ground contact area ratio for a new tire
    $\beta 1$ ... 15°
    $\beta 2$ ... 15°
    $\beta 3$ ... 15°
    $\beta 4$ ... 12°
  the ground contact area ratio Sa of the tread part Aa with smaller ground contact area ratio for a tire having a groove depth equal to ½ of the initial depth ... 0.81
  the ground contact area ratio Sb of the tread part Ab with larger ground contact area ratio for a tire having a groove depth equal to ½ of the initial depth ... 0.85
  the ratio Sa/Sb of the ground contact area ratios for a tire having a groove depth equal to ½ of the initial depth ... 0.95
  the ratio Ba/Bb of the shoulder rib width or shoulder block width Ba to the shoulder rib width or shoulder block width Bb for a new tire ... 0.91

Figure 2:
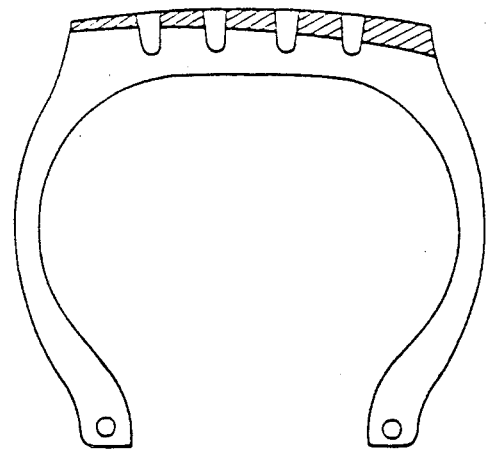

The pneumatic radial tire for heavy load with the foregoing specifications is mounted to a steering wheel of a heavy vehicle under conditions of the normal load and normal air pressure in accordance with JIS (Japanese Industrial Standard) and then subjected to the running test with the actual vehicle. As a result of this test, it has proved that the degree of abnormal wears is improved significantly. In other words, assuming that the conventional tire as shown in FIGS. 1 and 2 has the wear difference of 100 at the time when the groove depth has been worn 60% of the initial depth, the tire of this embodiment showed the wear difference of 26.

Figure 5:
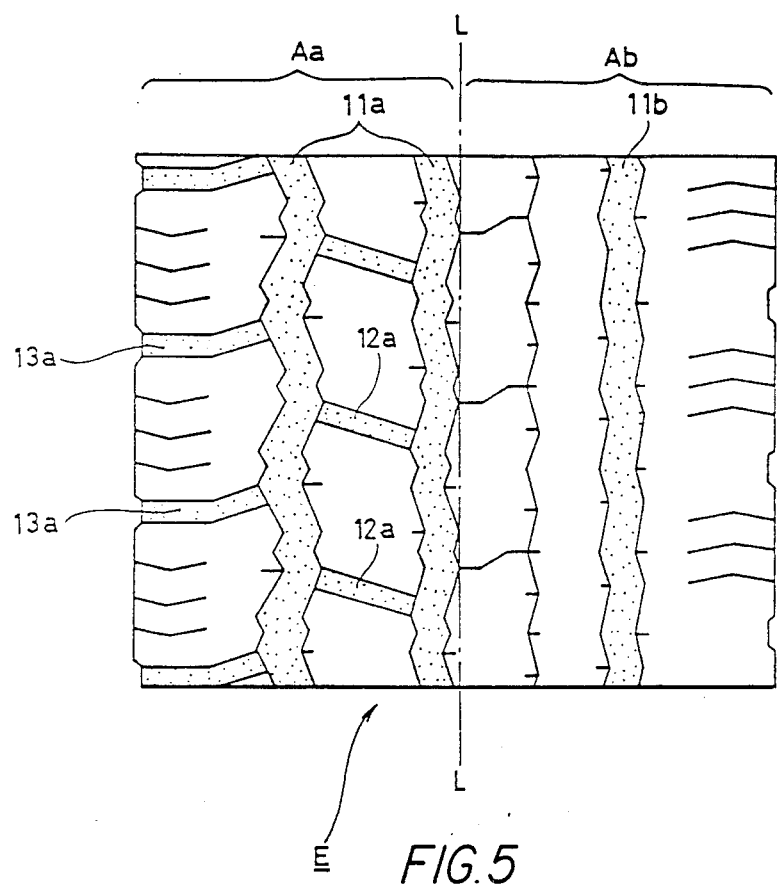

Although the foregoing description was directed to the first embodiment of the present invention in which the four main grooves 11 are arranged in the tread portion A as shown in FIGS. 3 and 4, the similar effect can be expected also for the second embodiment of the present invention in which three main grooves 11 are arranged in the tread portion A, as shown in FIG. 5.

The structure of the second embodiment will now be explained briefly with reference to FIG. 5. A tread design formed in the tread portion A comprises three zigzag main grooves 11 arranged substantially parallel to the equator plane L—L, and a plurality of subgrooves 12a arranged substantially in the radial direction and on the side of the tread part Aa only which locates in the inner side of the vehicle when mounted thereon.

Moreover, the width of each main groove 11a arranged in the tread part Aa locating on the inner side of the vehicle when mounted thereon is selected to be larger than that of the main groove 11b arranged in the tread part Ab locating on the outer side of the vehicle when mounted thereon, in order that the ground contact area ratio Sa of the tread part Aa becomes smaller than the ground contact area ratio Sb of the tread part Ab. Further, on the shoulder of the tread part Aa there are formed a plurality of lug grooves 13a leading to the main groove 11a with certain intervals in the circumferential direction of the tire.

The remaining structure is almost identical to that of the first embodiment mentioned above, so the detailed description will be omitted herein.

As fully explained in the above, according to the present invention, a tread design formed on the tread portion is divided into a tread part Ab with larger ground contact area ratio and a tread part Aa with smaller ground contact area ratio with the tread equator plane as a boundary, the ratio Sa/Sb of a ground contact area ratio Sa of the tread part Aa with smaller ground contact area ratio to a ground contact area ratio Sb of the tread part Ab with larger ground contact area ratio is set in a range of 0.71 through 0.89, and the tread part Aa with smaller ground contact area ratio is located on the inner side of a vehicle when the tire is mounted thereon. Consequently, abnormal wears, such as one-sided wear or shoulder wear, occurred in the tread portion of the tire mounted to, particularly, a steering wheel can be alleviated so as to improve wear resistance of the tread portion and hence to prolong the service life of tires remarkably.

The foregoing preferred embodiments of the present invention have been described by way of examples only, and various changes and modifications can be made for those skilled in the art without departing the scope of the invention as set forth in the attached claims.

What is claimed is:

1. A pneumatic radial tire for heavy load wherein a tread design formed on a tread portion is divided into a tread part Ab with larger ground contact area ratio and a tread part Aa with smaller ground contact area ratio with the tread equator plane as a boundary, the ratio Sa/Sb of a ground contact area ratio Sa of said tread part Aa with smaller ground contact area ratio to a ground contact area ratio Sb of said tread part Ab with larger ground contact area ratio is set in a range of 0.71 through 0.89, and set at a smaller ratio from when the tire is new in a range of 0.85 through 1.06 at a time when a depth of each groove constituting said tread design is substantially ½ of initial depth and said tread part Aa with smaller ground contact area ratio is located on an inner side of a vehicle when said tire is mounted thereon.

2. A pneumatic radial tire for heavy load according to claim 1, wherein the ratio Ba/Bb of a shoulder rib width or shoulder block width Ba of said tread part Aa with smaller ground contact area ratio to a shoulder rib width or shoulder block width Bb of said tread part Ab with larger ground contact area ratio is set in a range of 0.84 through 0.94.

* * * * *